United States Patent
Frigo et al.

(10) Patent No.: US 7,042,559 B1
(45) Date of Patent: May 9, 2006

(54) FAULT LOCATION APPARATUS AND PROCEDURES IN CWDM BUSINESS APPLICATIONS USING WAVELENGTH SELECTIVE OTDR

(75) Inventors: Nicholas J. Frigo, Little Silver, NJ (US); Patrick P Iannone, Red Bank, NJ (US); Kenneth C Reichmann, Hamilton, NJ (US)

(73) Assignee: AT&T Corp., New York, NY (US)

( * ) Notice: Subject to any disclaimer, the term of this patent is extended or adjusted under 35 U.S.C. 154(b) by 281 days.

(21) Appl. No.: 10/610,720

(22) Filed: Jul. 1, 2003

(51) Int. Cl.
*G01N 21/00* (2006.01)

(52) U.S. Cl. .................................. 356/73.1

(58) Field of Classification Search ............. 356/73.1; 385/24, 45; 398/1–38; 250/227.15, 227.23

See application file for complete search history.

(56) References Cited

U.S. PATENT DOCUMENTS 5,790,285 A * 8/1998 Mock .................. 398/21
6,445,445 B1 9/2002 Nakayama et al.

* cited by examiner

*Primary Examiner*—Tu T. Nguyen (57) ABSTRACT

A method for verifying fiber connections and diagnosing loss of light or loss of signal conditions in a WDM optical system. The method utilizes an optical time domain reflectometer (OTDR) having user-selectable wavelengths to shoot OTDR traces at a specified wavelength corresponding to an optical data-bearing channel into a selected one of a plurality of optical fiber transmission lines that are connected to a multiplexer that respectively multiplexes a data bearing channel carried on each of the plurality of optical fiber transmission lines onto a trunk, or a demultiplexer that demultiplexes multiplexed data bearing channels from the trunk. The OTDR receives backscattered light from the selected optical fiber transmission line and generates a trace of the backscattered light, thereby enabling a fault location in the WDM optical system to be determined from the trace.

14 Claims, 11 Drawing Sheets

FAULT LOCATION APPARATUS AND PROCEDURES IN CWDM BUSINESS APPLICATIONS USING WAVELENGTH SELECTIVE OTDR

FIELD OF THE INVENTION

The present invention relates generally to optical communications, and more particularly, to an apparatus and method of verifying fiber connections and diagnosing faults in wavelength division multiplexing (WDM) systems using an optical time domain reflectometer (OTDR) having user selectable wavelength capability, in which the set of wavelengths comprises the optical channels in a WDM transmission system.

BACKGROUND

Wavelength-division multiplexing (WDM) has been employed in core networks for almost a decade. WDM technology enables signals of multiple wavelengths to be concurrently transmitted over a given optical medium. This has been facilitated by the availability of wideband optical amplifiers that can simultaneously amplify many different wavelengths without distortion. The advantages provided by WDM translate into greater fiber utilization, lower capital expenditures associated with fiber deployment, and reduced costs in repeater stations by eliminating the need to terminate each wavelength along the fiber path. To maximize economic utility, the wavelength density that can be multiplexed onto a given fiber has increased in recent years: 80-wavelength systems are now common in the EDFA band, with 50 GHz frequency spacings between channels in many offerings. However, this dense WDM (DWDM) technology has not penetrated into local applications for several reasons, primarily including the relatively high costs per circuit arising from the fixed cost of equipment in local applications where the traffic volumes per route are relatively low. Recent developments in low-cost coarse WDM (CWDM) components have made this technology more practical for local applications. CWDM channel spacings are wider than DWDM spacings by a factor of about 50 or so. This relaxed tolerance translates into much easier fabrication, processing, and qualification procedures. An example of a CWDM application is described in co-owned Frigo et al. ("Frigo") U.S. patent application Ser. No. 10/127,195 entitled VIRTUAL COMMON SPACE: USING WDM IN METRO ACCESS NETWORKS, filed Apr. 22, 2002, the disclosure of which is incorporated by reference herein. The Frigo disclosure relates to a technique for serving individual high-volume fiber-to-the-floor (FTTF) customers in a building by installing low-cost CWDM multiplexers and demultiplexers in the basement. These devices are passive optics and capable of being installed inside wall-mounted splice enclosures, thus avoiding the costs associated with installing traditional high-speed multiplexers in the common space of the building. Other applications for CWDM include reinforcing existing metro rings that connect inter-office facility local network services (LNS) offices.

In WDM access applications, a plurality of optical channels, each to a different customer, are multiplexed onto an optical fiber. In an exemplary installation, riser fiber is installed between the common area of a building and customer premises in the building. The riser fibers are coupled to a demultiplexer that receives multiplexed signals from trunk fiber in the street, and a multiplexer for multiplexing signals from the customer site back to the trunk. These passive WDM nodes establish a connection with each individual customer over an assigned wavelength band. Craft personnel have to splice the riser fibers from each customer site to the correct ports of the multiplexer/demultiplexer components. It is then necessary to verify that the appropriate connections have been made for each customer after fiber and multiplexer/demultiplexer installation. It may also be necessary to further evaluate these connections if a loss of light (LOL) or loss of signal (LOS) condition subsequently arises.

The use of optical time domain reflectometers (OTDRs) to diagnose optical fiber losses and faults is known in the art. An OTDR permits an operator to essentially "look into" an optical fiber and locate points of loss (e.g., splices, bends) and failure (e.g., breaks, separated connectors). An OTDR emits a pulse of light that is propagated through a fiber of interest. The OTDR time-gates the detected optical backscattered return that results from fiber inhomogeneities or sources of reflections or losses, to convert time delay to fiber position, thereby enabling the location of the loss/failure point to be ascertained. A conventional OTDR that operates on a single specified wavelength is impractical, however, for troubleshooting WDM systems because the multiplexer/demultiplexer equipment have ports that are opaque to light having wavelengths outside their respective passbands. This necessitates coupling the OTDR into the trunk fiber, leaving the mux, the fiber before the mux, the demux, and the fiber after the demux undiagnosable. This is disadvantageous, since some fraction of the known failures occur inside offices and at customer sites. Thus, it would be advantageous to include these optical components in the diagnostic procedures. OTDRs that operate on multiple-wavelengths are known in the art. For example, U.S. Pat. No. 6,445,445 to Nakayama et al. ("Nakayama") discloses an OTDR that provides for switching the wavelengths of the OTDR's optical source. However, the Nakayama patent does not address diagnostics issues particular to WDM systems. The uses of multiple wavelength OTDRs in the current state of the art are primarily concerned with determining the amount of chromatic dispersion in a fiber link. This is determined by registering a feature on the OTDR trace (such as the end of the fiber) and, by justifying the time delays for the different wavelengths, determining the velocity of light at the different wavelengths and then fitting to a Sellmeier model for dispersion. In all such cases, the use of WDM systems is not anticipated because the properties of the Fabry-Perot lasers commonly used in these instruments are unsuitable for WDM transmission systems.

In other diagnostic schemes, as mentioned above, OTDRs at long wavelengths (such as 1625 nm, outside the conventional WDM bands) are used as an adjunct for trunk diagnostics. In these cases, a WDM filter is used to merge the OTDR wavelength onto and off of the trunk fiber. That is, the OTDR is used exclusively to check the integrity of the trunk, since the WDM filters prohibit that light from reaching either the mux or the demux. This method is not perfect for DWDM systems, but is commonly used because the optics for such systems is quite localized. Applications which we describe herein do not share this attribute of equipment localization, and for such applications the intra-trunk filters are not advantageous.

SUMMARY OF THE INVENTION

In accordance with an aspect of the invention, a method is provided for verifying fiber connections and diagnosing loss of light or loss of signal conditions in a WDM optical system, not only at the installation of the passives (fibers, WDM muxes and demuxes, and the connections between them), but also while the system is in service. That is, it is anticipated that the verification and diagnostic procedures can be implemented at one wavelength channel while live traffic is being carried over other channels on the trunk. The method utilizes an optical time domain reflectometer (OTDR) having user-selectable wavelengths to shoot an optical pulse at a specified wavelength corresponding to an optical data-bearing channel into a selected one of a plurality of optical fiber transmission lines that are connected to a multiplexer that respectively multiplexes a data bearing channel carried on each of the plurality of optical fiber transmission lines onto a trunk, or a demultiplexer that demultiplexes multiplexed data bearing channels from the trunk. The OTDR receives backscattered light from the selected optical fiber transmission line and generates a trace of the backscattered light, thereby enabling a fault location in the WDM optical system to be determined from the trace.

In accordance with another aspect of the invention, the method enables fault diagnosis in a WDM optical system serving a plurality of customers in a building from a local network services (LNS) node, which may be an office or equipment in a co-located local serving office (LSO). Hereinafter, the term 'LNS node' is meant to encompass all such configurations. The method enables craft personnel to determine fault location from either a customer premises, or the LNS node by coupling the OTDR into one of the WDM channels. That is, instead of coupling into the trunk fiber, the OTDR is coupled into the fiber that is connected to either a transmitter or a receiver on one of the specified WDM channels, and the wavelength of the OTDR is selected to correspond to the wavelength of that channel.

In accordance with yet another aspect of the invention, the method enables fault diagnosis in a WDM system connecting a plurality of LNS nodes. The method eliminates the need to break, test, and resplice trunk lines connecting the LNS nodes, since the fault location may be ascertained from either of the LNS nodes connected by the trunk line.

These and other aspects of the invention will now be described in detail with particular reference to the accompanying drawings.

BRIEF DESCRIPTION OF THE DRAWINGS

FIG. 5b is an exemplary OTDR trace representing a situation without and with a fiber cut in a trunk connecting multiplexer/demultiplexer components in the WDM system of FIG. 5a;

DETAILED DESCRIPTION OF THE PREFERRED EMBODIMENTS

With reference now to the several views of the drawings, a method is described for verifying and diagnosing optical media connections in WDM systems.

Figure 1:
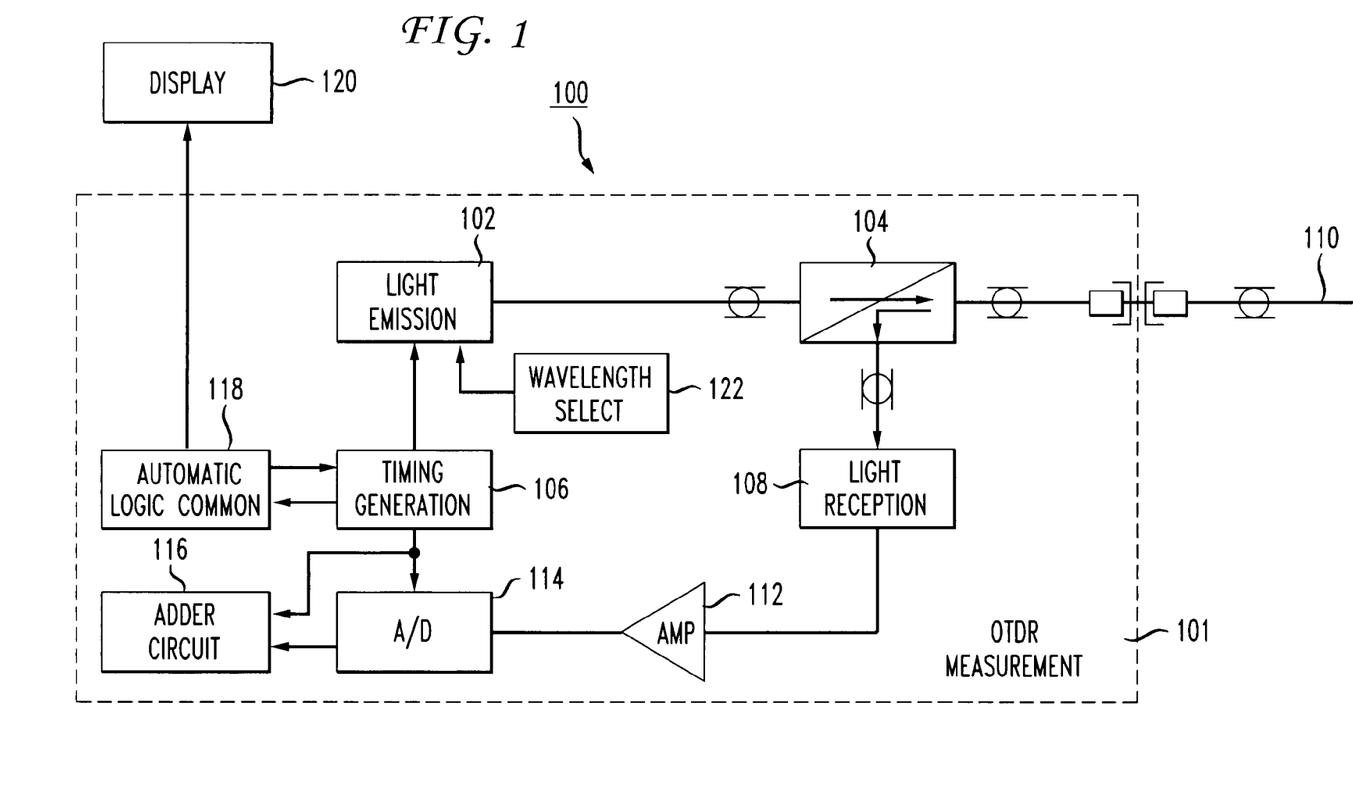
FIG. 1 is a schematic of an exemplary OTDR.

FIG. 1 is a schematic of an exemplary OTDR 100, which generally comprises an OTDR measurement section 101 including a light emission source 102, optical coupler 104, timing generation section 106, and light reception section 108. The timing generation section 106 communicates a signal to the light emission source 102 to generate an optical pulse, which is incident on an optical fiber generally represented at 110. The optical pulse propagates through the fiber 110, and any reflected or backscattered light is returned through the optical coupler 104 and captured by the light reception section 108. This backscattered light is amplified with a predetermined amplification factor by amplifier 112, and converted to a digital signal by A/D converter 114. In the A/D converter 114, the amplifier output is sampled in a predetermined sampling cycle, and the sampled data is communicated to an adder circuit 116. The adder circuit 116 sums the sampled data for a predetermined amount of time and averages the data. The averaged data is input to an arithmetic logic section 118, which conducts arithmetic operations on various measurements based upon the respective averaged data. These results are then displayed as numeric value and waveform data on a display unit 120. This data enables the fiber splice loss, return loss, unit length loss, total loss and total return loss to be ascertained. Conventional OTDRs have laser sources that are not registered to the wavelength standard (ITU-T G.694.2) for the CWDM band (i.e., bands centered at 1610 nm, 1590 nm, etc.), i.e. they are not able to "look into" such standardized channels. A control section generally characterized by the reference numeral 122, enables a user to select the wavelength of the optical pulse such that it will correspond to the passbands associated with individual ports on the WDM equipment. While in conventional OTDRs, these wavelengths are at common Fabry-Perot wavelengths, with proper design these wavelengths can be chosen to be the same as the wavelength channels of the WDM system. This enables the optical pulse to pass through a mutliplexer/demultiplexer that is opaque to light on wavelengths outside the correct port bandwidth. When the correct wavelength is selected, light emitted from the OTDR exhibits the same characteristics as light propagating through the system on an individual data-bearing channel. This will be explained in more detail below.

Figure 2:
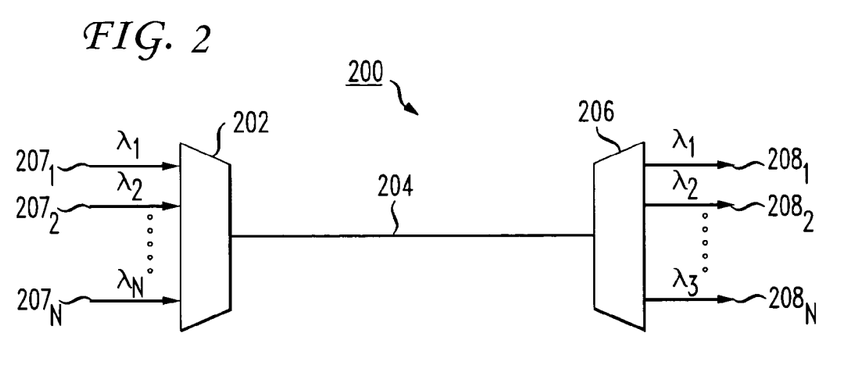
FIG. 2 is a schematic of one side of an illustrative WDM system.

FIG. 2 is a schematic of part of an illustrative WDM system 200, comprising an input multiplexer 202, trunk 204, and output demultiplexer 206. A plurality of optical signals at specified wavelengths $\lambda_1, \lambda_2 \ldots \lambda_n$ are communicated through optical fibers $207_1, 207_2 \ldots 207_N$ to the input ports of multiplexer 202. These signals are multiplexed onto the trunk 204 as is well known in the art. The multiplexed signals are demultiplexed by demultiplexer 206, and the individual signals $\lambda_1, \lambda_2 \ldots \lambda_n$ are output from the output ports to individual optical fibers $208_1, 208_2 \ldots 208_N$. Commonly, a transmission system comprises four (4) such lines: two (2) for the transmission and reception along one path, and two (2) others for an equivalent protection circuit.

Figure 3:
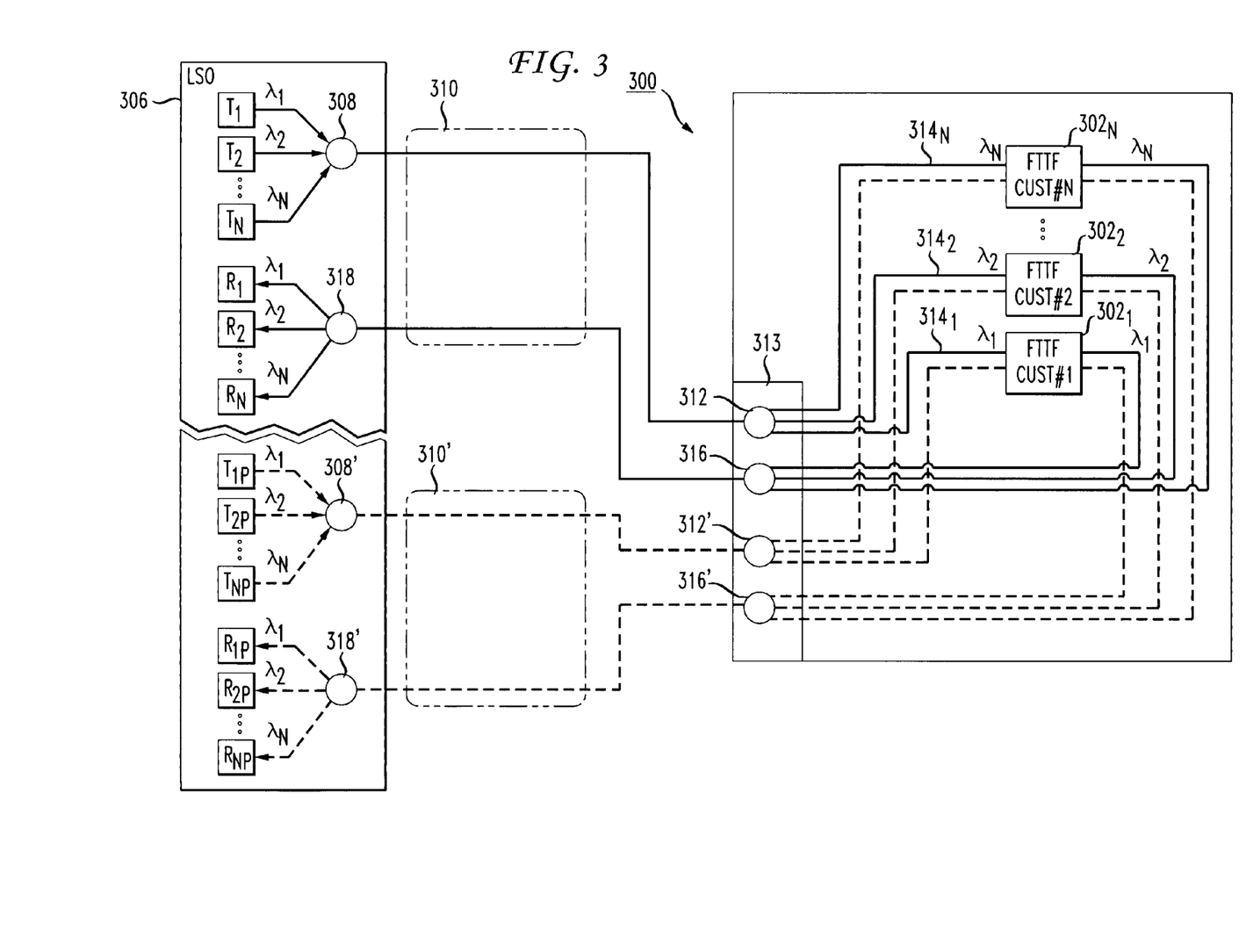
FIG. 3 is an exemplary installation of a WDM system serving fiber-to-the-floor (FTTF) customers in a building from a local network service (LNS) node.

Referring to FIG. 3, there is shown an illustrative installation 300 utilizing WDM, where fiber-to-the-floor (FTTF) customers $302_1, 302_2 \ldots 302_N$ in a building are connected to a local node 306. Each customer $302_1, 302_2 \ldots 302_N$ is served on a particular wavelength $\lambda_1, \lambda_2 \ldots \lambda_n$, respectively. The LSO 306 includes a plurality of transmitters, $T_1, T_2 \ldots T_N$ that communicate respective optical signals $\lambda_1, \lambda_2 \ldots \lambda_n$ to a multiplexer 308. The multiplexed signals are carried over a trunk 310 to a demultiplexer 312, which is located, in an illustrative embodiment, in a common space 313 in the basement of the building 304 as described in detail in the co-owned Frigo patent application, discussed above. Riser lines $314_1, 314_2 \ldots 314_N$ carry the demultiplexed signals $\lambda_1, \lambda_2 \ldots \lambda_n$ to the respective FTTF customers $302_1, 302_2 \ldots 302_N$. The respective customers have receivers for receiving the signals that are omitted for clarity. Return traffic is transmitted to a mutliplexer 316, which multiplexes individual signals from each customer $\lambda_1, \lambda_2 \ldots \lambda_n$ back onto the trunk 310. Again, the transmitters associated with the customer sites are omitted from the drawing for clarity. These signals are demultiplexed by demultiplexer 318 and received by respective receivers $R_1, R_2 \ldots R_N$ at the LSO 306. Protection traffic is carried over trunk 310' in the same manner, with the circuits depicted by dotted lines. The multiplexers and demultiplexers for the protection circuit are identified by the same numbers, plus an apostrophe. The transmitters and receivers are indicated with a "P" for "protection." This arrangement provides an independent backup in the event the main link fails.

Figure 4A:
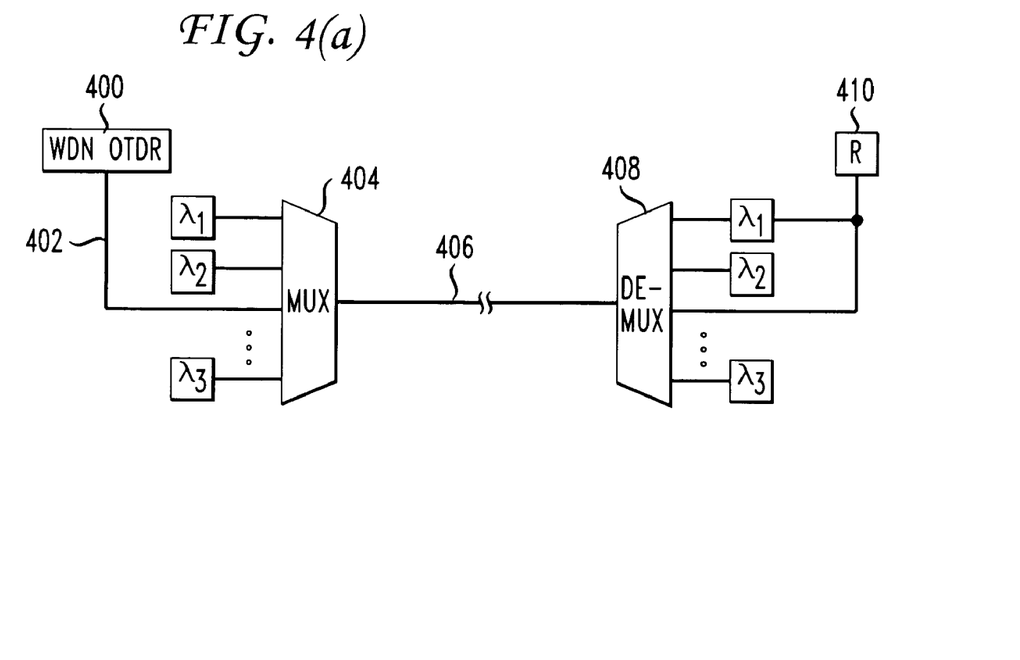
FIG. 4a is a schematic of a wavelength selectable OTDR connected to a WDM system to perform fault diagnosis in accordance with an aspect of the invention.
Figure 4B:
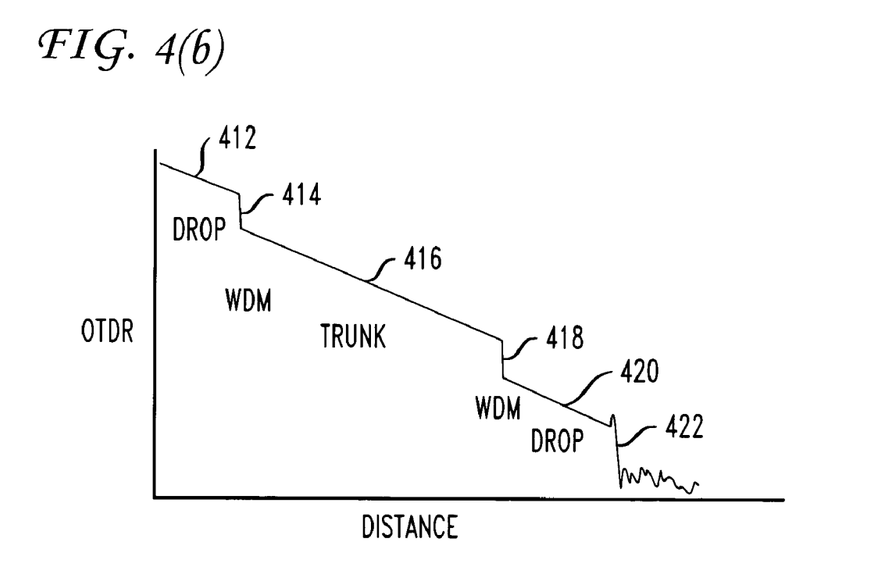
FIG. 4b is an expected OTDR trace for a system with no faults.

During installation, it is necessary to verify that the appropriate connections have been made. In accordance with an aspect of the present invention, a wavelength adjustable OTDR is used to improve the efficiency of standard provisioning operations. The OTDR source is matched to the channel used for a particular customer, such that the light from the OTDR will behave exactly like the light on a data bearing channel serving that customer. This enables connection verification at the customer location. For example, to verify a connection from FTTF customer #1 ($302_1$), an installer might shoot a trace from the customer premises at wavelength $\lambda_1$ through feeder line $314_1$. Light will traverse the drop fiber connecting the OTDR to the correct port of multiplexer 316, traverse the multiplexer 316, enter the trunk fiber 310, traverse the trunk 310 to the demultiplexer 318, get routed to the correct port of the demultiplexer 318, and traverse the drop fiber at the LSO 306. The OTDR time-gates the backscattered light from the pulses, and plots the overall loss vs. distance. A schematic of this for a normal connection is depicted in FIGS. 4a and 4b. In this manner, the connections of both links can be verified before the transmission equipment is installed on the optical links.

FIG. 4a is a schematic of a wavelength selectable OTDR 400 sending its light pulses through the drop (riser) fiber 402 at wavelength $\lambda_1$ to the input port of a multiplexer 404 in a customer's building (not shown). These pulses are sent through the trunk 406 to a demultiplexer 408 at the LSO (not shown). The light leaves the appropriate port of the multiplexer 408, and enters the drop (intra-office) fiber connected to a receiver 410 at the LSO (not shown). FIG. 4b is a schematic of the expected trace that one would expect for this measurement, essentially plotting cumulative loss experienced by the target pulse vs. distance. The initial downward sloping line at 412 represents a relatively small loss attributable to the light traversing the drop fiber. The precipitous drop at 414, is due to insertion loss at the multiplexer 404. This might actually contain a slight bump, which is omitted for clarity. The plot shows another generally downward sloping line at 416 for light traveling through the trunk 406. The precipitous drop at 418 represents insertion loss at the demultiplexer 408. Light leaving the demultiplexer 408 would be expected to experience a further relatively small loss as it traverses the drop fiber connecting the demultiplexer 408 to the receiver 410, which is indicated at 420 on the plot. Finally, the abrupt drop off at 422 represents fiber termination, since there would be no further backscattered light after this point. An entirely equivalent process applies to OTDR traces shot from the office, and the transmit/receive directions through the mux and demux are equivalent, so this figure corresponds to four situations.

Figure 5A:
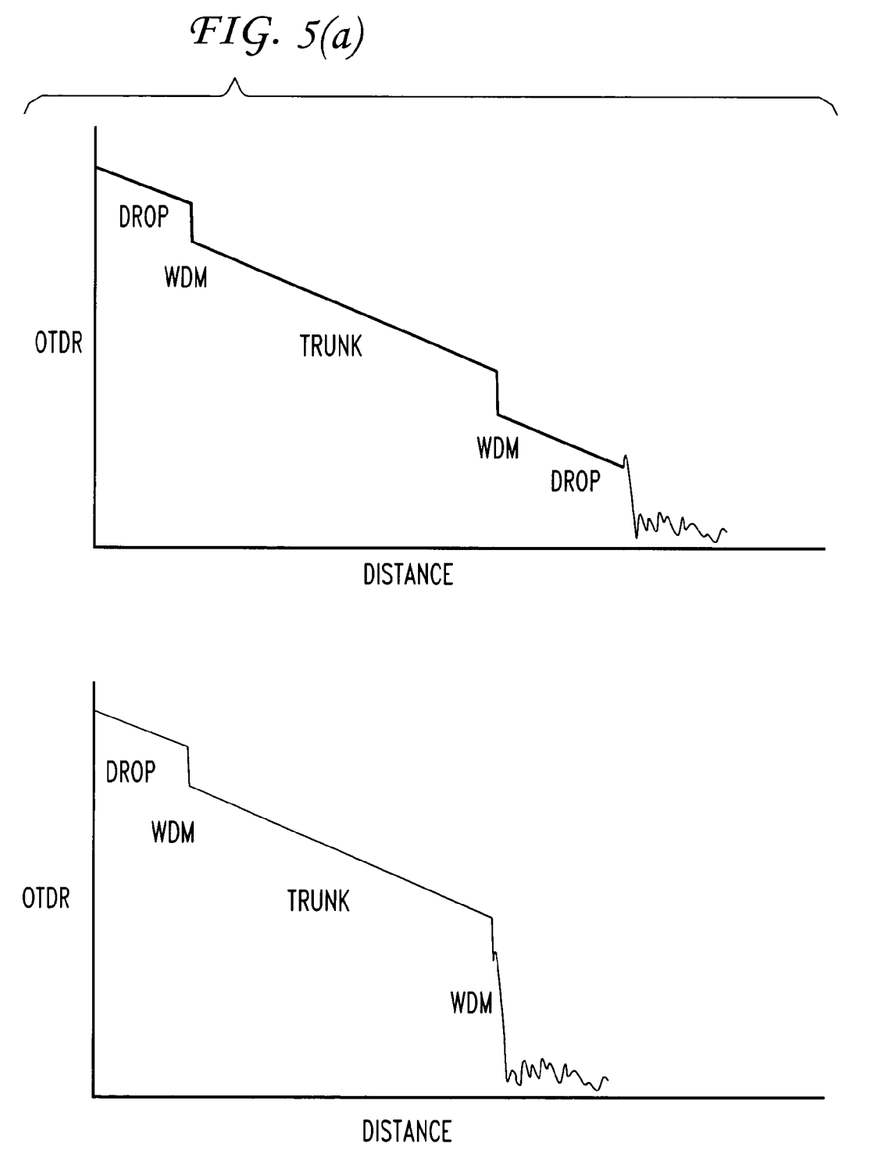
FIG. 5a is an exemplary OTDR trace representing a situation without and with a potential fiber cut in a drop fiber in a WDM system.
Figure 5B:
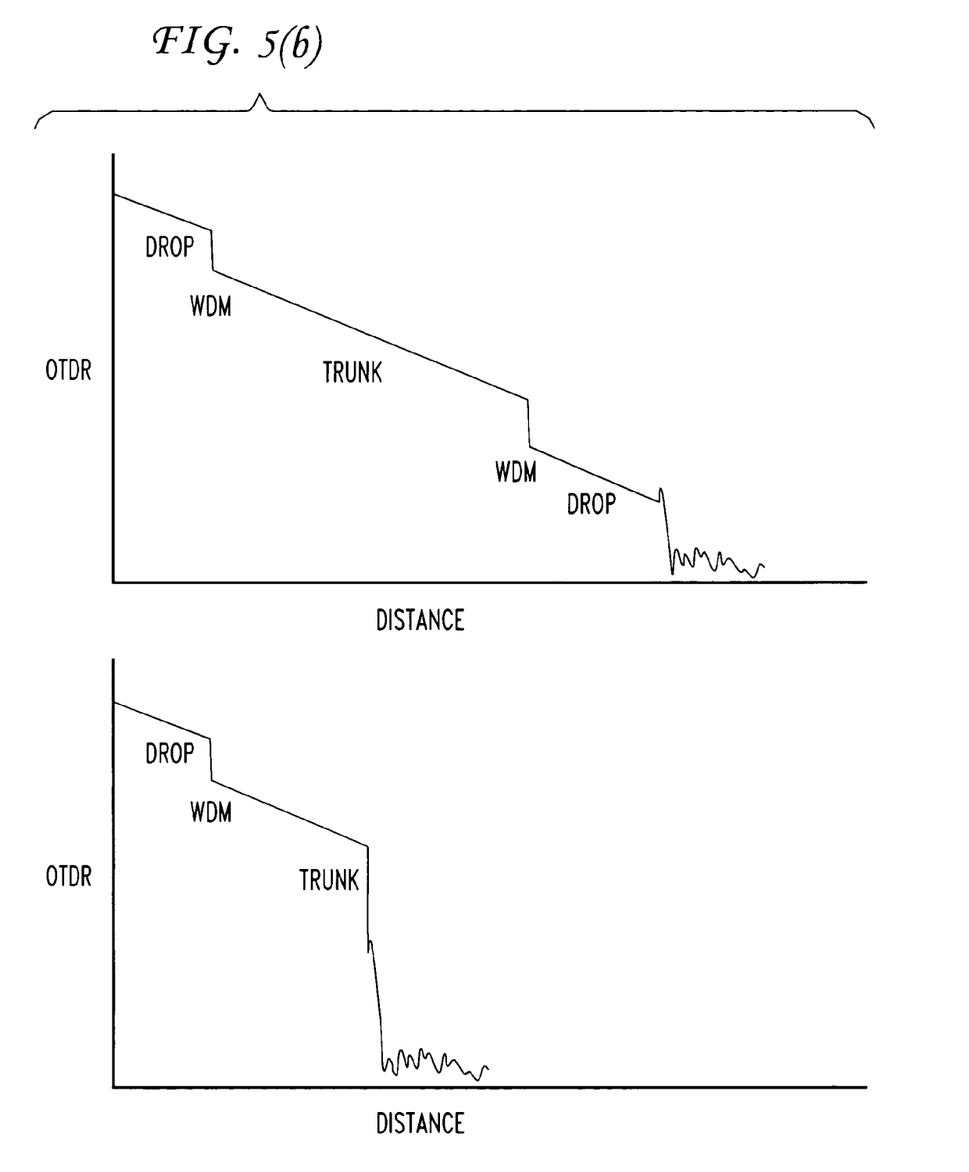
Figure 5C:
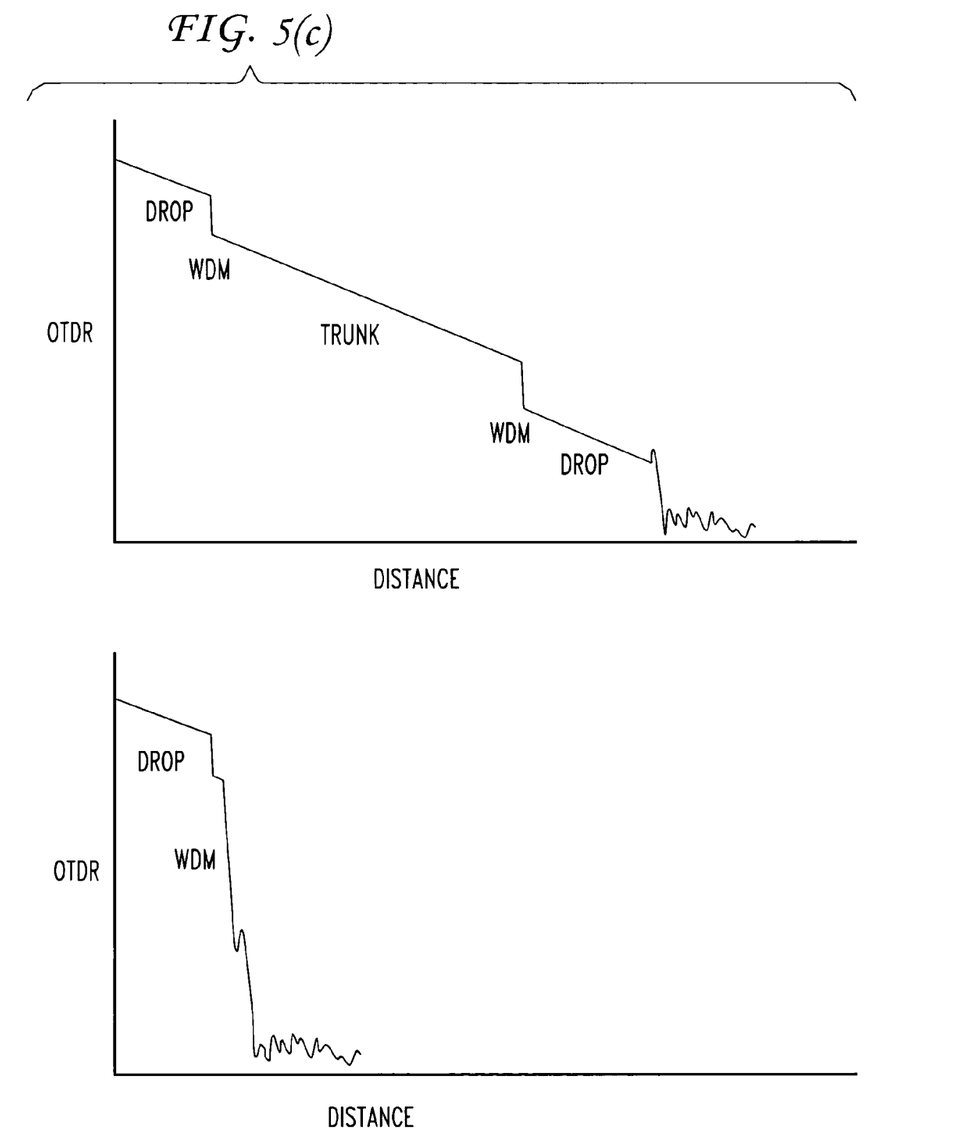
FIG. 5c is an exemplary OTDR trace representing a situation without and with a fiber cut near a multiplexer/demultiplexer on the side of the system closer to the location of the OTDR.
Figure 5D:
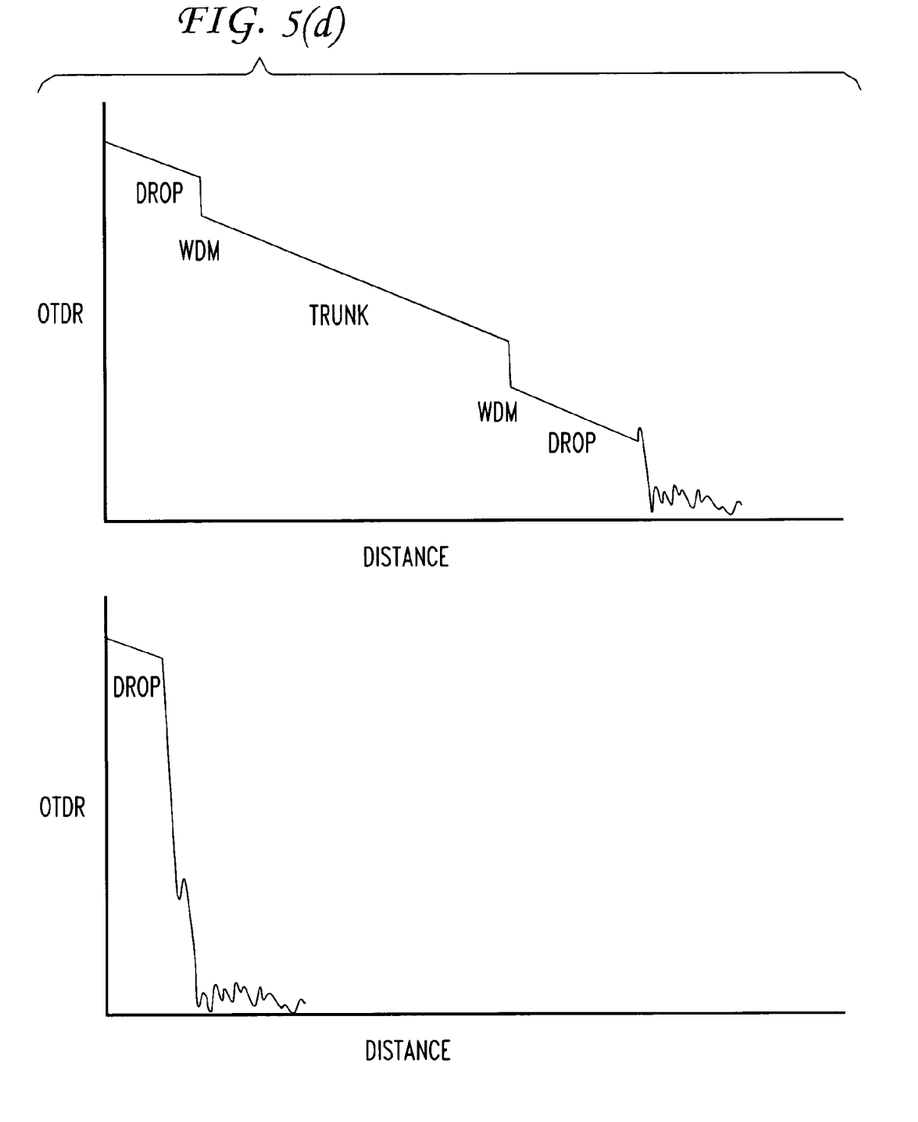
FIG. 5d is an exemplary OTDR trace representing a situation without and with a fiber cut in the drop fiber between the OTDR and the mutliplexer/demultiplexer port.

FIGS. 5a–5d are depictions of traces that would be expected for fiber cuts occurring at successively closer points to the origination of the optical pulse from the OTDR. Each of FIGS. 5a–5d replicates a normal trace in the top half of the figure, and a trace of a fiber break in the lower half of the figure. For this example, the OTDR is connected to the drop fiber between a customer and a multiplexer in a common space in the customer's building. The multiplexer multiplexes individual data-bearing channels from a plurality of customers onto a trunk line, which in turn is connected to a demultiplexer at the LNS node serving those customers. The demultiplexer is likewise connected to a plurality of drop lines that communicate with individual receiving hardware associated with the LNS node. In FIG. 5a, a fiber cut has occurred near the demultiplexer (408 in FIG. 4) on the drop fiber side at LNS node. This trace might also represent a failure at the demultiplexer itself. In FIG. 5b, a fiber break has occurred somewhere along the trunk. In this case, the linear relation of the drop can be related to the location along the trunk. In FIG. 5c, the trace represents a fiber cut in the trunk near the multiplexer (404 in FIG. 4). The use of extra "slack" fiber in a splice tray disposed inside the enclosure for the mutliplexer/demultiplexer equipment can prevent ambiguity in determining whether a fiber failure or hardware failure has occurred for those cases where the trace reveals a drop proximal to the hardware. The length of the slack fiber should be selected such that it is longer than the OTDR resolution length. FIG. 5d illustrates a fiber break on the drop fiber side of the mutliplexer (404 in FIG. 4). This break is evident from the large drop in the trace prior to where insertion loss at the mutliplexer would be expected.

The above-described procedure enables craft personnel (CP) to verify connections from the customer premises or from the office. If the connections are correct, the trace will look like that shown in FIG. 4b. Any excess losses can be noted and splices redone as required. If the CP is using the wrong wavelength or if the fiber is hooked up to the incorrect port of the multiplexer/demultiplexer equipment in the common space in the building, the CP will observe a trace as depicted in FIG. 5d and rectify the problem. If the fiber at the LNS end is connected to the wrong port or the connection is not secure, the trace illustrated in FIG. 5a will result. This procedure simplifies the installation process. Since every customer's connection must be tested, the ability to perform one-time connection verification can potentially save a significant fraction of the CP installation and verification time, since it is decoupled from the transmission equipment installation process. This is increasingly important in WDM applications, where each customer has four (4) WDM connections (i.e., for working and protection fibers), where the potential for errors is high. CP can perform the connection verification process independently of the installation process, thereby allowing for the installation to be contracted, spread out temporally, or implemented by different crews. It will be appreciated by those skilled in the art, that these loss measurements can also be performed from the opposite end of the system at the LNS node. The traces depicted in FIGS. 5a–5d would have complementary profiles with their respective slopes angled downward towards the customer sites.

Figure 6:
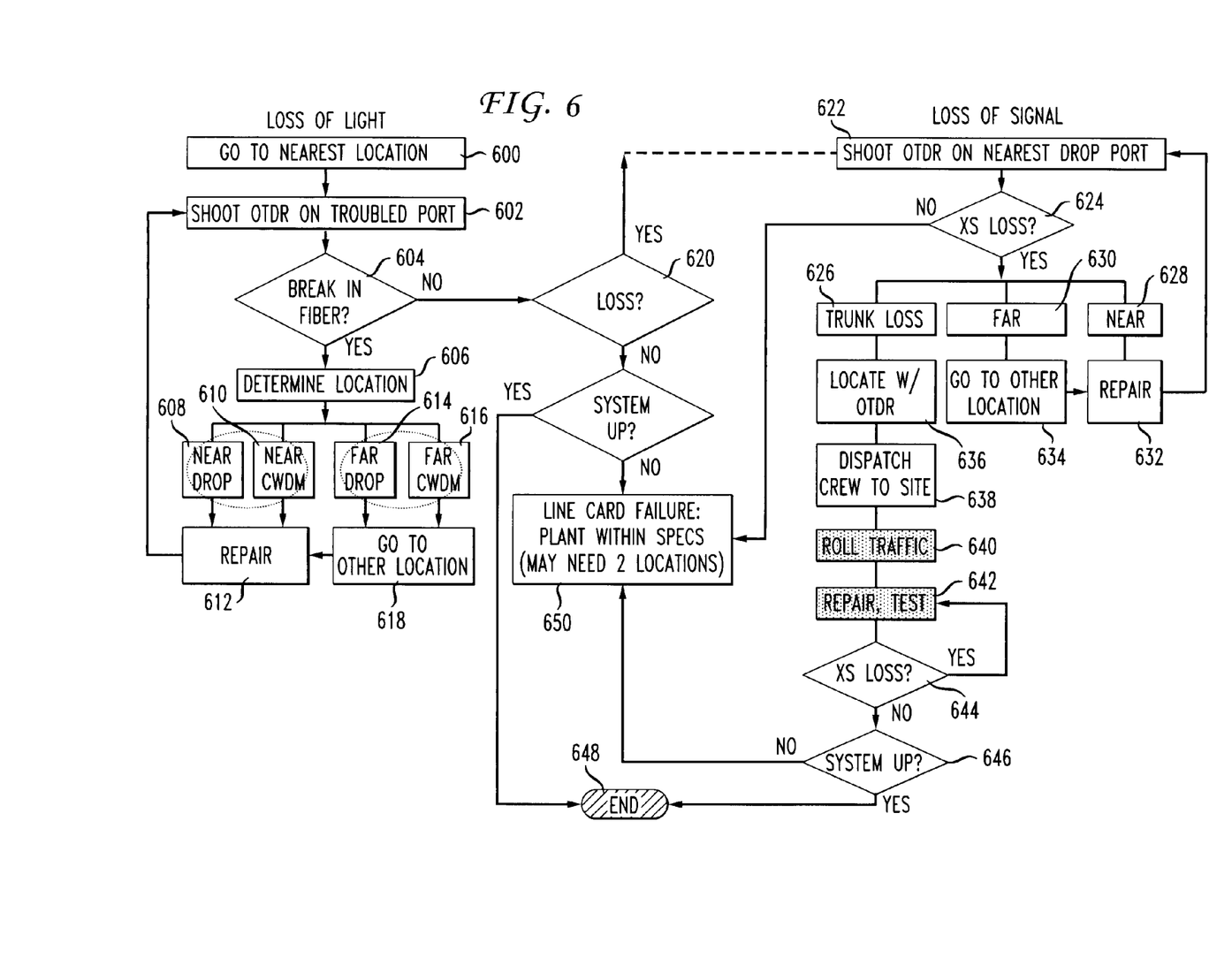
FIG. 6 is a flow diagram of an exemplary diagnosis procedure for loss-of-light (LOL) and loss-of-signal (LOS) conditions using a wavelength selectable OTDR in accordance with an aspect of the invention.

During operation of the system, there are two primary types of failures that can occur and that the transmission equipment will alarm: loss-of-light (LOL) and loss-of-signal (LOS). A LOL condition is caused by a fiber break. In a LOS condition, light is passing through the circuit but there is sufficient loss due to fiber damage such that the system is operating below an acceptable threshold. FIG. 6 is a flowchart of a process for diagnosing LOL and LOS conditions using a wavelength selectable OTDR. For this example, it is assumed that a LOL failure has occurred on only one channel (i.e., one customer). This is separable from a trunk failure, since the other channels are presumed to be still in operation (if not, it would be an obvious trunk failure and the trunk could be opened at will). At 600, CP are dispatched to either the customer premises, or the LNS office. For this example, the CP will first troubleshoot from the customer premises. At 602, the CP utilizes an OTDR to shoot a trace through the drop fiber connecting the customer premises to the port of the mutliplexer/demultiplexer (CWDM equip.) corresponding to the wavelength of the channel in question. If a break in the fiber is ascertained at 604, the CP will determine the location of the break at 606 by examining the OTDR trace in accordance with known practice. If the break occurred in the drop fiber prior to the CWDM equip. connection (608), or near the CWDM equip. (610), then the CP makes the necessary repair (612). If the break is in the drop fibers (614) at the other location, i.e., the LNS, or near the CWDM equip. at the LNS (616), then the CP go to the LNS (618), and make the necessary repair (612). If the riser can be seen, then the dispatch of the OSP craft may possibly be avoided. The OTDR is used again to verify the connection after the repair has been made (602). If there is a LOS condition (indicated by the yes branch from step 620), the CP will undertake the same procedure to locate the lossy section. Alternatively, if the original alarm was LOS, the technician would enter the flowchart at this point. Assuming that the diagnosis is initiated at the customer premises, at 622 the CP shoots trace through the drop fiber connecting the customer premises to the port of the mutliplexer/demultiplexer (CWDM equip.) corresponding to the wavelength of the channel experiencing the loss. At 624, excess loss is noted in the OTDR trace using the same procedure described above. This loss may be characterized as trunk loss 626, near loss 628 (in the customer drop fibers or proximal to the CDWM equip. in the customer's building), or far loss 630 (in the drop fibers or near the CWDM equip. at the LNS location). If the lossy section at the customer premises, the CP make the appropriate repair at 632. If the OTDR trace indicates that the lossy section is located at the LNS location, then the repair is made at that site. As discussed above, the initial diagnosis may be made from the opposite side (i.e., the LNS office), with the process starting at the LNS instead of the customer premises. If there is a trunk loss (626), then after the location is ascertained from the OTDR trace at 636, the CP are dispatched to the location of the lossy section at 638. In order to make the necessary repair, traffic is rolled off the trunk at 640. Advantageously, the trunk does not have to be opened to make this diagnosis, thus limiting the amount of time the circuits are in in an unprotected state. At 642, the trunk is repaired and retested using the foregoing procedures. If there is no excess loss noted at 644, and the system is up and running at 646, then the process is finished. If the system is still not running properly at 646, then there is a potential line card failure indicated at 650. This is because the fiber plant is now known by these tests to be within the normal specifications for the system.

Figure 7:
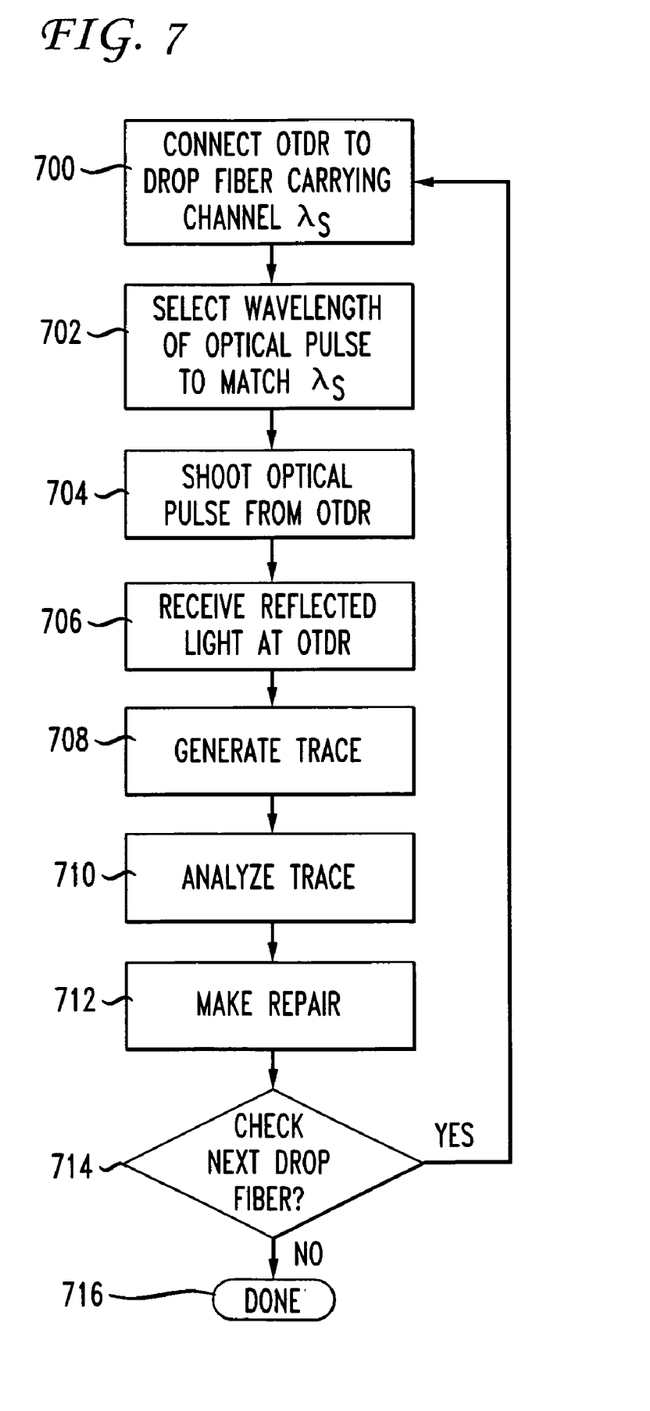
FIG. 7 is a flow diagram of an exemplary procedure utilizing a wavelength selectable OTDR in accordance with the present invention.

FIG. 7 is a flow chart of a method in accordance with an aspect of the present invention for implementing an exemplary fault diagnosis in a WDM system. At 700, CP connect an OTDR to a drop fiber carrying signals at a selected wavelength $\lambda_S$.

At 702, the CP selects the same wavelength $\lambda_S$ for the optical pulse on the OTDR. The user may have to select other basic parameters such as distance range, number of averaging processings and the like. The OTDR can set reference data and alarm levels respectively for various measurement items including splice loss, return loss, unit length loss, total loss and return loss. The reference data are arbitrarily set by the input operation of the user based on an OTDR standard, such as, for example GENERIC REQUIREMENTS GR-196-CORE ISSUE 1, SEPTEMBER 1995 (Generic Requirements for Optical Time Domain Reflectometer (OTDR) Type Equipment, Bellcore (Bell Communications Research)), pp. B-1 to B-12. In accordance with this standard, unit length loss, splice loss and return loss are specified as Attenuation Coefficient Lead-in Fiber, Event Loss and Event Reflectance, respectively.

At 704, the CP shoots the optical pulse through the WDM system. The optical pulse is based on settings made by the measurement condition setting section of the OTDR.

At 706, the OTDR receives reflected light (backscatter) from the drop fiber under investigation. The optical pulse is converted into an electrical signal and processed by the OTDR.

At 708, the OTDR generates a trace such as shown in FIGS. 5a–5d.

At 710, the CP analyzes the trace to determine the location of the break or lossy section in the system and either makes, or directs the appropriate CP to make, repairs at 712.

At 714, the CP determines whether another drop fiber carrying another channel on a different wavelength is to be checked. If additional fibers need to be verified, then the CP goes back to step 700 and connects the OTDR to the new fiber and the process is repeated. If all fibers have been checked, then the CP is finished at 716. As described above, the entire process can be implemented at either the customer site or the LNS office.

Figure 8:
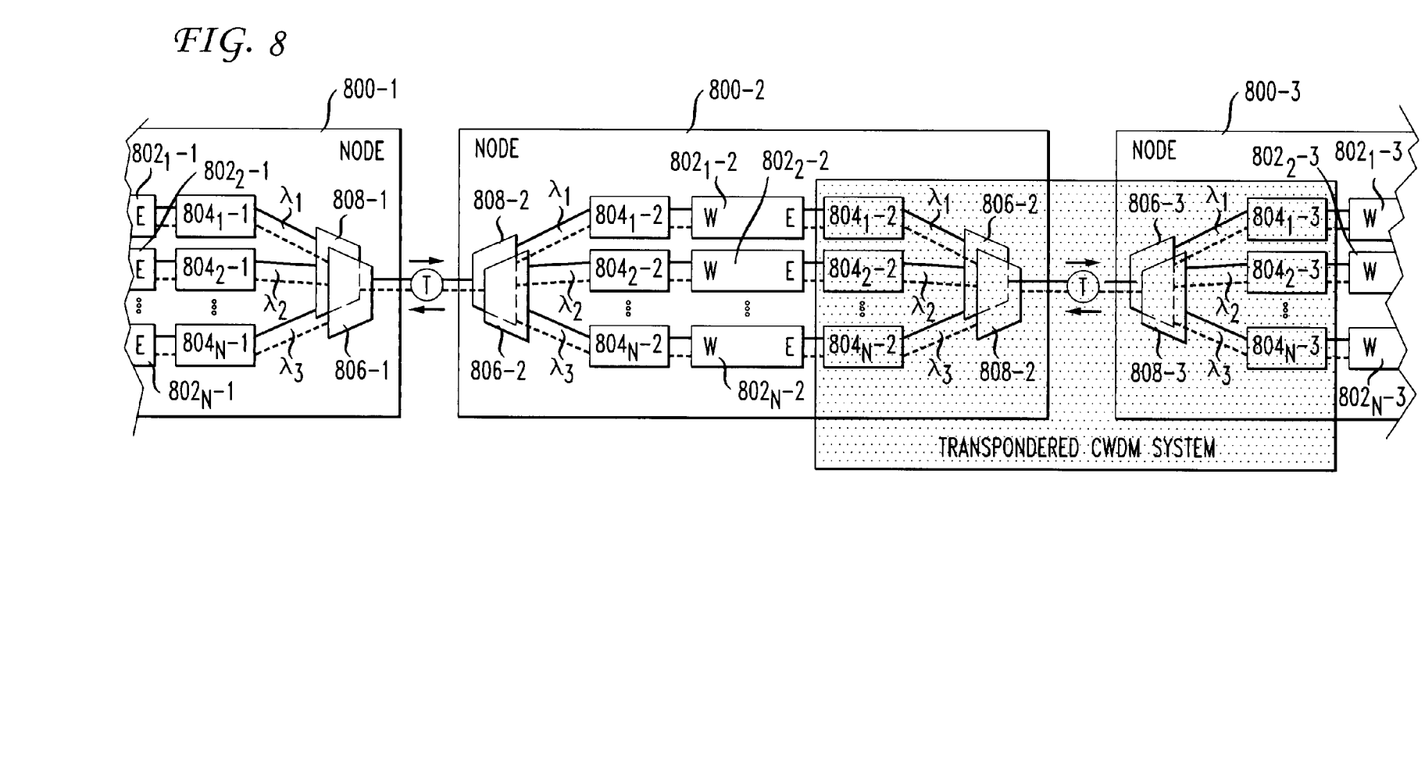
FIG. 8 is a schematic of an exemplary WDM system connecting LNS nodes.

Referring now to FIG. 8, there is depicted an illustrative WDM system comprising a plurality of LNS nodes 800-1, 800-2, 800-3. Each node includes respective service gear generally denoted by $802_1$-1, $802_2$-1 . . . $802_N$-1; $802_1$-2, $802_2$-2 . . . $802_N$-2; and $802_1$-3 $802_2$-3 . . . $802_N$-3. A plurality of respective transponders, which are transmitter/receivers (T/R) $804_1$-1, $804_2$-1 . . . $804_N$-1; $804_1$-2, $804_2$-2 . . . $804_N$-2; and $804_1$-3, $804_2$-3 . . . $804_N$-3 which are coupled to the service gear in order to adapt the optical output of the service gear to the WDM system. In the future, it may become more common for the service gear's optical output to already be at the correct wavelengths for common Coarse WDM systems, so the function of these transceivers may be subsumed into the service gear. The T/R is shown as a single entity for clarity, but may comprise individual units for respectively transmitting and receiving optical signals on a specified wavelength over feeder fibers to the multiplexers and demultiplexers 806-1, 808-1; 806-2, 808-2; and 806-3, 808-3. The multiplexed and demultiplexed signals are carried over trunks T between the LNS nodes.

In accordance with another aspect of the invention, the foregoing methodology can be utilized to verify the connections of the individual data-bearing channels between LNS nodes. For example CP desire to verify the connection between transmitter/receiver (T/R) $804_1$-2 at LNS 800-2, and the corresponding T/R $804_1$-3 at LNS 800-3. The CP connects an OTDR to the drop fiber connecting the transmitter of T/R $804_1$-2 to the appropriate port for the channel in question (i.e., $\lambda_1$) of multiplexer 808-2 (for outbound signals to LNS 800-3). The CP selects the same wavelength $\lambda_1$ on the OTDR, and shoots an optical pulse through the drop fiber. This pulse traverses the multiplexer 808-2, trunk T, demultiplexer 806-3, and the drop fiber connecting demultiplexer 806-3 to the receiver of T/R $804_1$-3. The OTDR generates a trace as described above and illustrated in FIGS. 5a–5d. From this trace, the CP can diagnose an installation, or an LOL or LOS condition, and make the appropriate repair. The process can be repeated for all connections using the same methodology. Further, the OTDR can be connected at either LNS node to verify the connections or to diagnose problems during system operation.

The present invention has been shown and described in what are considered to be the most practical and preferred embodiments. It is anticipated, however, that departures may be made therefrom and that obvious modifications will be implemented by those skilled in the art.

We claim:

1. A method for verifying fiber connections and determining the location of fiber impairments causing loss of light or loss of signal conditions in a WDM optical system comprising a plurality of optical data-bearing channels each having one of a plurality of different wavelengths, said method comprising the steps of:
    selecting from said plurality of wavelengths a particular wavelength corresponding to an optical data-bearing channel to be verified;
    directing an optical pulse having said particular wavelength into a selected one of a plurality of optical fiber transmission lines that are connected to a multiplexer that multiplexes a data bearing channel carried on each of the plurality of optical fiber transmission lines onto a trunk fiber, or a demultiplexer that demultiplexes multiplexed data bearing channels from the trunk fiber;
    receiving backscattered light from the selected optical fiber transmission line; and
    determining a fault location in the WDM optical system from the backscattered light.

2. The method recited in claim 1, further comprising selecting said particular wavelength on an optical time domain reflectometer (OTDR).

3. The method recited in claim 2, further comprising the step of connecting the OTDR to the optical fiber transmission line at a customer premises.

4. The method recited in claim 2, further comprising the step of connecting the OTDR to the optical fiber transmission line at the local network services (LNS) node.

5. A method for verifying fiber connections and determining the location of fiber impairments causing loss of light or loss of signal conditions in a WDM optical system serving a plurality of customers in a building from a local network services (LNS) node, each of said customers being served by an optical data-bearing channel associated with one of a plurality of different wavelengths, said method comprising the steps of:
    selecting from said plurality of wavelengths a particular wavelength corresponding to an optical data-bearing channel to be verified;
    directing an optical pulse having said particular wavelength into a selected one of a plurality of optical fiber transmission lines that are connected to a multiplexer that respectively multiplexes a data bearing channel carried on each of the plurality of optical fiber transmission lines onto a trunk fiber, or a demultiplexer the demultiplexes multiplexed data bearing channels from the trunk fiber, an OTDR receiving backscattered light from the selected optical fiber transmission line; and
    determining a fault location in the WDM optical system from the analysis of backscattered light.

6. The method recited in claim 5, further comprising selecting the particular wavelength on the OTDR.

7. The method recited in claim 5, wherein each customer is disposed in a respective location in the building, and the method further comprises the step of connecting the OTDR to the optical fiber transmission line at the location of said customer having the respective connection tested.

8. The method recited in claim 5, further comprising the step of connecting the OTDR to the optical fiber transmission line at the LNS node.

9. A method for verifying fiber connections and determining the location of fiber impairments causing loss of light or loss of signal conditions in a WDM optical system comprising a plurality of optical data-bearing channels each having one of a plurality of different wavelengths, said method comprising the steps of:
    selecting from said plurality of wavelengths a particular wavelength corresponding to an optical data-bearing channel to be verified;
    directing an optical pulse having said particular wavelength into a selected one of a plurality of optical fiber transmission lines that are connected to a multiplexer that multiplexes a data bearing channel carried on each of the plurality of optical fiber transmission lines onto a trunk fiber, or a demultiplexer that demultiplexes multiplexed data bearing channels from the trunk fiber; and
    receiving backscattered light from the selected optical fiber transmission line to show a fault location in the WDM system.

10. The method recited in claim 9, further comprising selecting the particular wavelength on an optical time domain reflectometer (OTDR) capable of emitting optical pulses on multiple wavelengths corresponding to the data-bearing channels of a plurality of customers served by the WDM system.

11. The method recited in claim 10, further comprising the step of connecting the OTDR to the optical fiber transmission line at a customer premises.

12. The method recited in claim 10, further comprising the step of connecting the OTDR to the optical fiber transmission line at a local network services (LNS) node.

13. A method for verifying fiber connections and determining the location of fiber impairments causing loss of light or loss of signal conditions in a WDM optical system connecting a plurality of local network services (LNS) nodes via a plurality of optical data-bearing channels each having one of a plurality of different wavelengths, said method comprising the steps of:

selecting from said plurality of wavelengths a particular wavelength corresponding to an optical data-bearing channel to be verified;

using an optical time domain reflectometer (OTDR) to test said optical data-bearing channel by directing an optical pulse having said particular wavelength into a selected one of a plurality of optical fiber transmission lines that are connected to a multiplexer at one of the plurality of LNS nodes that multiplexes a data bearing channel carried on each of the plurality of optical fiber transmission lines onto a trunk fiber, or a demultiplexer at one of the plurality of LNS nodes that demultiplexes multiplexed data bearing channels from the trunk fiber, the OTDR receiving backscattered light from the selected optical fiber transmission line; and determining a fault location in the WDM optical system from the backscattered light.

14. A method for verifying fiber connections and determining the location of fiber impairments causing loss of light or loss of signal conditions in a WDM optical system connecting a plurality of local network services (LNS) nodes via a plurality of optical data-bearing channels each having one of a plurality of different wavelengths, said method comprising the steps of:

selecting from said plurality of wavelengths a particular wavelength corresponding to an optical data-bearing channel to be verified;

directing an optical pulse having a said particular wavelength into a selected one of a plurality of optical fiber transmission lines that are connected to a multiplexer at one of the plurality of LNS nodes that multiplexes a data bearing channel carried on each of the plurality of optical fiber transmission lines onto a trunk fiber, or a demultiplexer at one of the plurality of LNS nodes that demultiplexes multiplexed data bearing channels from the trunk fiber; and receiving backscattered light from the selected optical fiber transmission line in order to show a fault location in the WDM system.

* * * * *